United States Patent
Mohapatra et al.

(10) Patent No.: US 11,474,982 B2
(45) Date of Patent: Oct. 18, 2022

(54) ZERO DOWNTIME EVOLUTION OF DATABASE SCHEMAS FOR CLOUD APPLICATIONS

(71) Applicant: SAP SE, Walldorf (DE)

(72) Inventors: Aniket Mohapatra, Heidelberg (DE); Simon Lueders, Walldorf (DE)

(73) Assignee: SAP SE, Walldorf (DE)

( * ) Notice: Subject to any disclaimer, the term of this patent is extended or adjusted under 35 U.S.C. 154(b) by 266 days.

(21) Appl. No.: 16/520,692

(22) Filed: Jul. 24, 2019

(65) Prior Publication Data

US 2020/0034342 A1    Jan. 30, 2020

Related U.S. Application Data

(60) Provisional application No. 62/703,760, filed on Jul. 26, 2018.

(51) Int. Cl.
   *G06F 16/21*  (2019.01)
   *G06F 16/25*  (2019.01)

(52) U.S. Cl.
   CPC ............ *G06F 16/213* (2019.01); *G06F 16/25* (2019.01)

(58) Field of Classification Search
   CPC .............................. G06F 16/213; G06F 16/25
   See application file for complete search history.

(56) References Cited

U.S. PATENT DOCUMENTS

| | | | | |
|---|---|---|---|---|
| 8,775,861 | B1* | 7/2014 | Raizen | G06F 11/1662 714/4.12 |
| 2012/0041933 | A1* | 2/2012 | Driesen | G06F 16/214 707/E17.005 |
| 2014/0075032 | A1* | 3/2014 | Vasudevan | H04L 41/50 709/226 |
| 2014/0095432 | A1* | 4/2014 | Trumbull | G06F 16/00 707/610 |
| 2015/0012919 | A1* | 1/2015 | Moss | G06F 9/455 718/1 |
| 2017/0140146 | A1* | 5/2017 | Mehta | G06F 21/6218 |

* cited by examiner

*Primary Examiner* — Ashish Thomas
*Assistant Examiner* — Dustin D Eyers
(74) *Attorney, Agent, or Firm* — Schwegman Lundberg & Woessner, P.A.

(57) ABSTRACT

In an example embodiment, a first version of a cloud-based application is deployed. The first version of the cloud-based application contains references, based on a first schema, to a first database. Then a second version of the cloud-based application, different than the first version, is deployed. The second version of the cloud-based application contains references, based on a second schema, to the first database. Then access to the second version of the cloud-based application to one or more user devices is prevented while permitting testing devices to have access to the second version of the cloud-based application, while migrating data from the first schema of the first database to the second schema of the first database. Then access to the second version of the cloud-based application to the one or more user devices is permitted once the migrating of the data is complete.

20 Claims, 10 Drawing Sheets

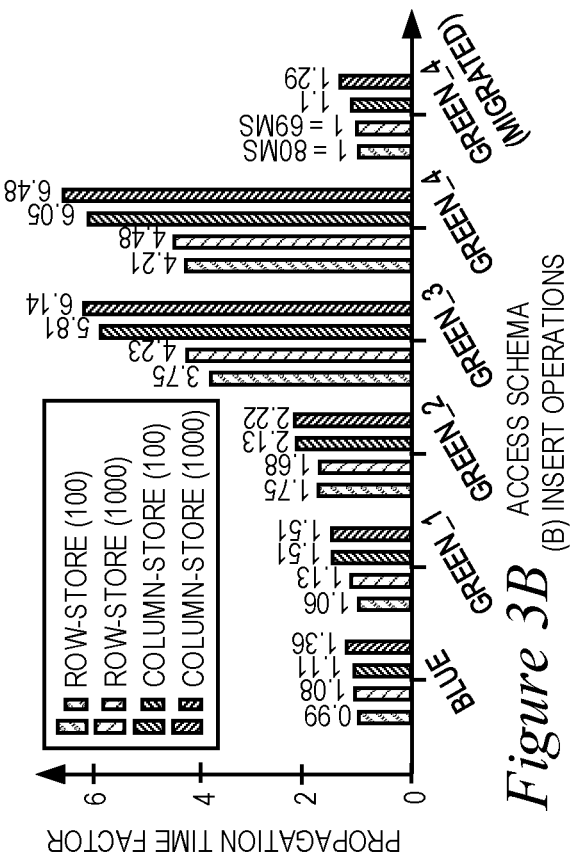
*Figure 3B* (B) INSERT OPERATIONS
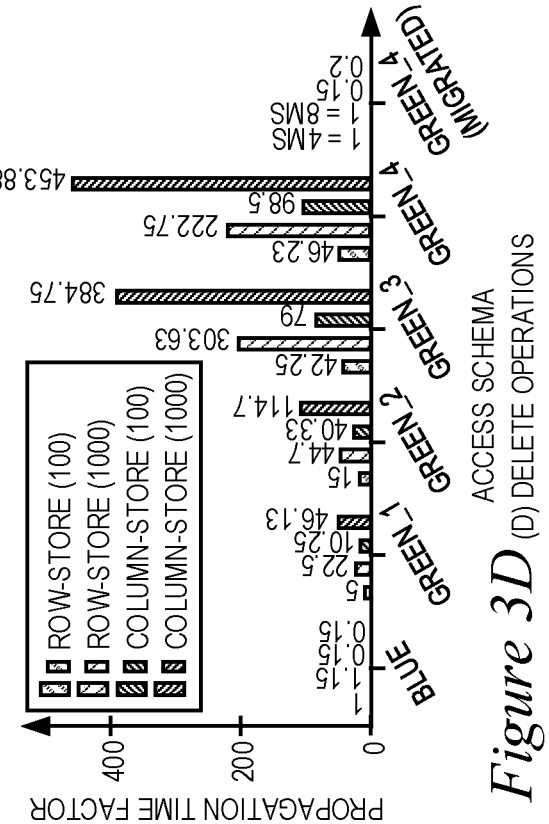
*Figure 3D* (D) DELETE OPERATIONS
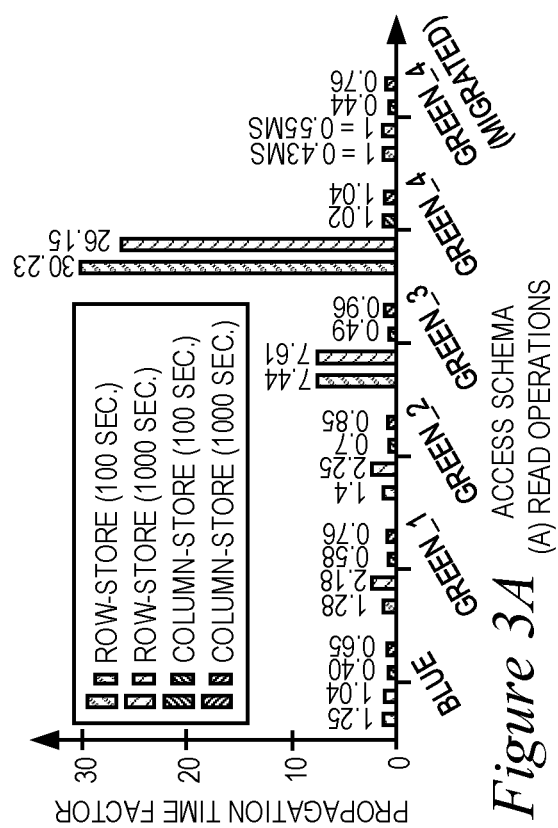
*Figure 3A* (A) READ OPERATIONS
*Figure 3C* (C) UPDATE OPERATIONS

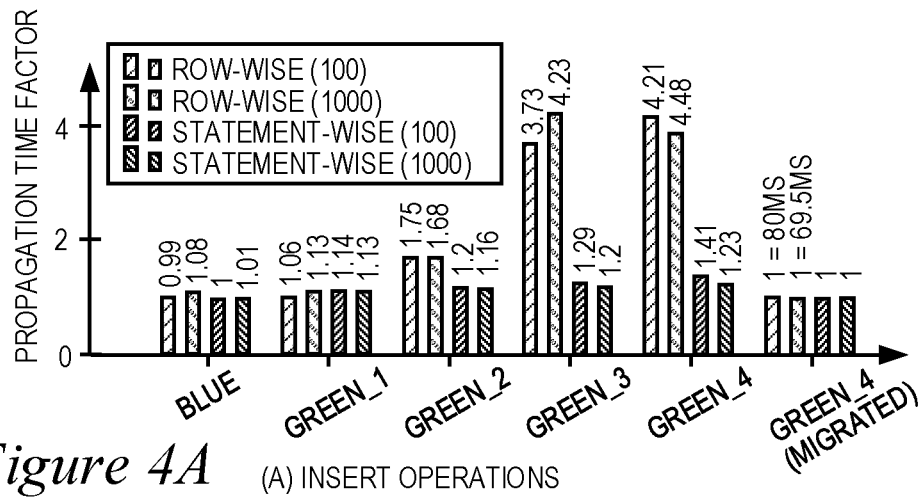
*Figure 4A*  (A) INSERT OPERATIONS
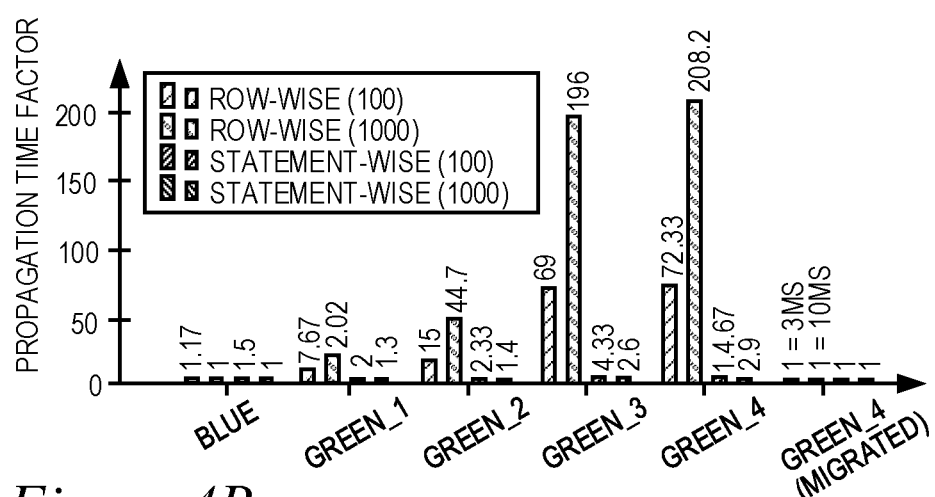
*Figure 4B*  (B) UPDATE OPERATIONS
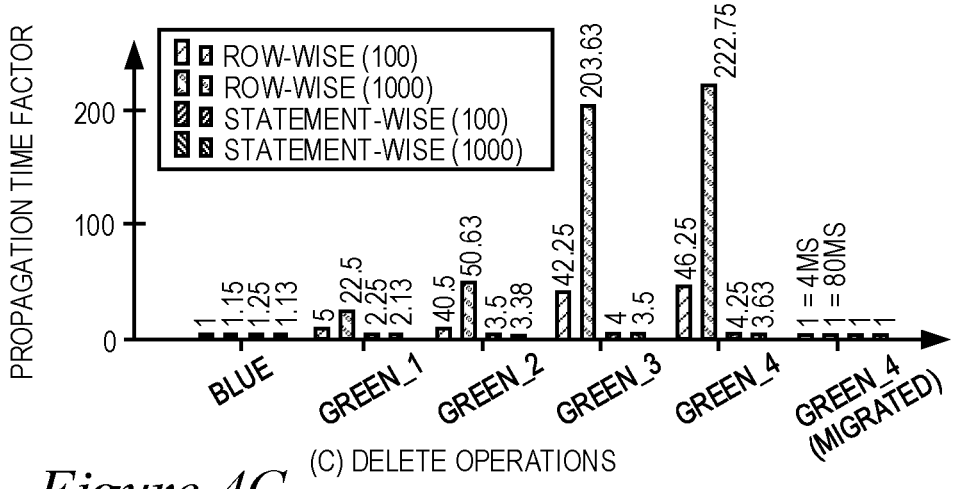
*Figure 4C*  (C) DELETE OPERATIONS (A) PERFORMANCE OF SINGLE SMOS (INSERT)

(B) PERFORMANCE OF SINGLE SMOS (UPDATE)

(C) PERFORMANCE OF SINGLE SMOS (DELETE)

WRITE PROPAGATION THROUGH SINGLE SMOS

ZERO DOWNTIME EVOLUTION OF DATABASE SCHEMAS FOR CLOUD APPLICATIONS

CROSS-RELATION TO RELATED APPLICATIONS

This application claims priority to U.S. Provisional Application No. 62/703,760, filed Jul. 26, 2018, entitled "SEAMLESS DATABASE EVOLUTION FOR CLOUD APPLICATIONS," hereby incorporated herein by reference in its entirety.

TECHNICAL FIELD

This document generally relates to systems and methods for cloud applications. More specifically, this document relates to the evolution of database schemas for cloud applications.

BACKGROUND

Cloud computing is an Information Technology (IT) paradigm that enables ubiquitous access to shared pools of configurable system resources and higher-level services that can be rapidly provisioned with minimal management effort, typically over the Internet. Modern cloud application platforms additionally facilitate the seamless testing and deployment of new versions of software. Both the old version and the new version run in parallel for some time, with developers working with the new version while user devices are still using the old version. Once the new version is approved, user devices can be migrated to the new version. This reduces the overall downtime and the risk of faulty changes.

Established tools, however, such as Cloud Foundry (www.cloudfoundry.org) explicitly exclude database applications, since the database as a single point-of-truth cannot co-exist in both the old version and the new version at the same time. Thus, whenever a schema of the database is evolved, all currently existing data and all applications that access the schema have to be evolved as well. Without platform support, this has to be performed manually by implementing data migration procedures, writing adapters for not yet updated user devices, etc. This make the database evolution process very time consuming, expensive, and error-prone, and is thus a limiting factor for the fast and continuous evolution of entities wishing to operate cloud-based applications that rely on databases.

BRIEF DESCRIPTION OF DRAWINGS

The present disclosure is illustrated by way of example and not limitation in the figures of the accompanying drawings, in which like references indicate similar elements.

FIG. 3A shows propagation overhead for a read operation for both row- and column stores, in accordance with an example embodiment.

FIG. 3B shows propagation overhead for insert operations, in accordance with an example embodiment.

FIG. 3C shows propagation overhead for update operations, in accordance with an example embodiment.

FIG. 3D shows propagation overhead for delete operations, in accordance with an example embodiment.

FIG. 4A shows the performance comparison of row-wise vs. statement-wise triggers for insert operations, in accordance with an example embodiment.

FIG. 4B shows the performance comparison of row-wise vs. statement-wise triggers for update operations, in accordance with an example embodiment.

FIG. 4C shows the performance comparison of row-wise vs. statement-wise triggers for delete operations, in accordance with an example embodiment.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In an example embodiment, a framework termed Single-Branch Forward-Only Database Schema Evolution & Migration (SIFODEM) is provided that applies advances in database evolution for the deployment of database applications in cloud platforms. Specifically, an architecture is provided to integrate seamless database evolution in existing tools. This can be performed in a way that guarantees that no data will be corrupted during the evolution and migration processes. Specifically, multiple schema versions may coexist in the same database. This may be performed, for example, by a database language designed to permit multiple schema versions to coexist.

Additionally, extensive evaluation may be performed by analyzing performance characteristics to equip developers with a guideline for the use of row- or column-stores, and highlight the need for statement-wise triggers to gain significant speed advantages.

In an example embodiment, SIFODEM may adopt a blue-green deployment from cloud application platforms to database evolution. The initial application version is called the blue version. While the new/modified green version is developed, the blue is live and active (evolution phase). Once green is ready, it is deployed and thoroughly tested. Once this testing is done, all user devices are migrated to the green version (migration phase). Now the requests are routed to the green version so that the blue version can be taken offline. Generally, such an approach would not be applicable to database applications as it will lead to data discrepancy between the green and the blue database version.

In an example embodiment, in a first phase, the new green schema version is already fully accessible but the data remains physically in the original blue schema version and all applications continue working on the old version. The developers and test user devices can access the new green schema version to develop and evaluate new features, bugfixes, etc. In the second phase, the data is physically migrated to the new green schema version. After completion, the new green version can be accessed by all applications and the old blue schema version is taken offline.

Figure 1:
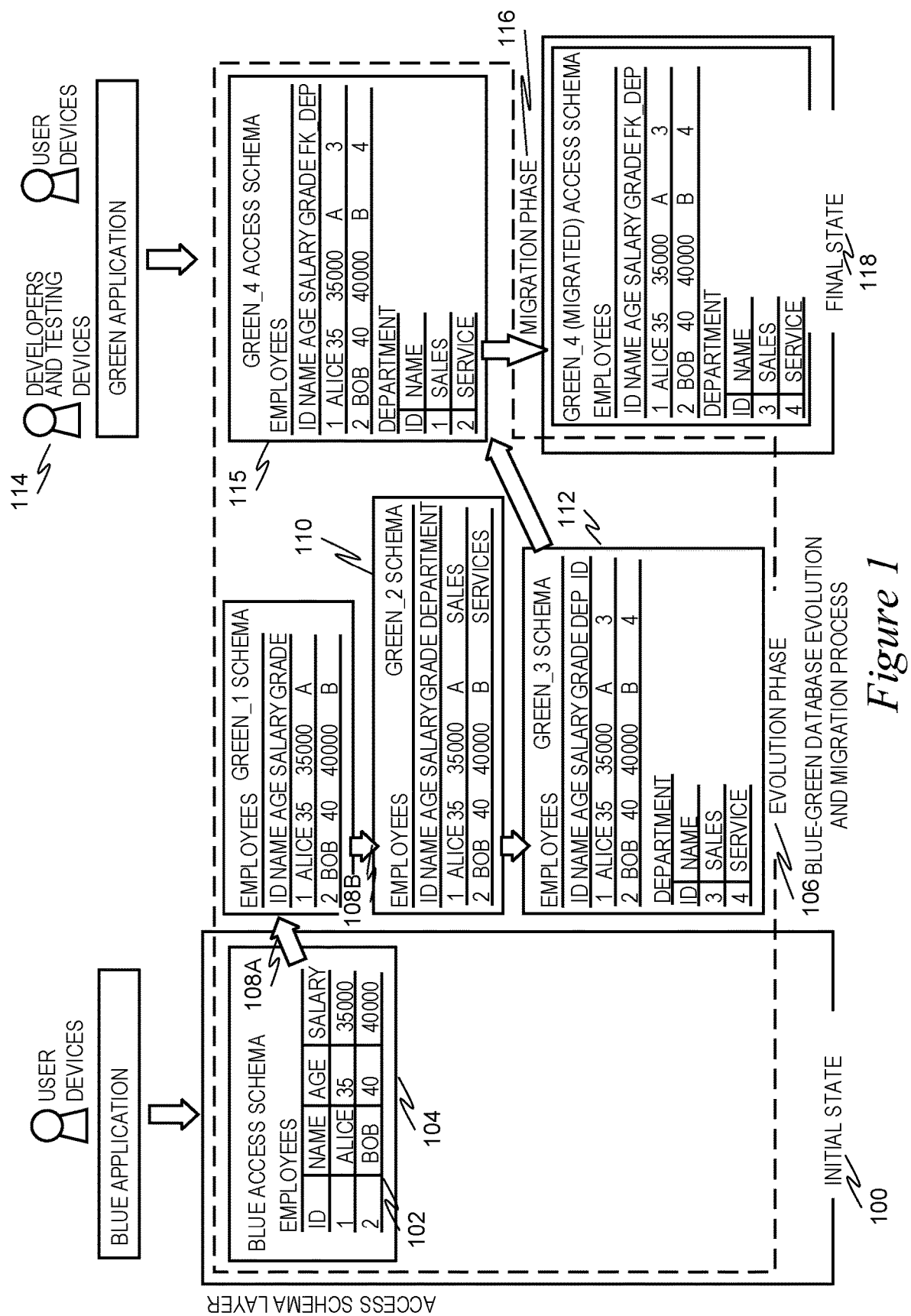
FIG. 1 is a diagram illustrating an example of software using SIFODEM, in accordance with an example embodiment.

FIG. 1 is a diagram illustrating an example of software using SIFODEM, in accordance with an example embodiment. In an initial state 100, there is a simple table for the employee details that is referenced by a view 102 as shown in the blue access schema 104 on the left side of the figure. User applications access this blue schema version 104 just as any other regular database.

In an evolution phase 106, developers evolve the application and the database schema to create a new green version by executing Database Evolution Languages (DELs). DELs provide a set of Schema Modification Operations (SMOs), which are refactorings on the database schema. SMOs couple the evolution of both the schema and the data in intuitive and consistent evolution operations (E.g., partitioning or joining existing tables. SMOs are considerably more compact than Structured Query Language (SQL) scripts. Since manual schema evolution is a heavily error prone and expensive operation, it is beneficial to have operations like SMOs which can perform the required task in a clean and consistent manner without the risk of corrupting data.

In the example in FIG. 1, it may be assumed that new features need two new columns to be added: "Department" and "Grade". Developers express this intended evolution by executing two ADD COLUMN SMOs 108A, 108B as shown next to the arrows for the first two evolution steps in FIG. 1. While the first ADD COLUMN SMO 108A produces the intermediate schema version GREEN_1, the second ADD COLUMN SMO 108B results in GREEN_2. During testing, it was unexpectedly discovered that it would be beneficial to normalize the Employees table and split away the Department column while creating a new foreign key—this results in the GREEN_3 schema version 112. For better readability, the team decides to rename the Department column into Name to finally end up in the GREEN_4 access schema 115.

In the evolution phase 106, both the blue and green schema versions are fully accessible. User devices can still use the old version, while the developers and testing devices 114 can use the new version just as usual. SIFODEM uses code generation to create green access schemas with views—any write operation on these views is executed by instead-of triggers that propagate the write operation back to the blue data schema. Since not all information can be stored in the blue data schema, SIFODEM automatically manages auxiliary tables that keep all the otherwise lost information. Both the blue and the green schema versions are now guaranteed to behave like regular single-schema databases even though the data is still stored only in the blue schema version.

Turning now to the migration phase 116, up until this point, user devices did not notice any change as they continuously used the blue version. When the developers and testing devices 114 confirm that the new green version works correctly, the migration phase 116 may be entered by instructing SIFODEM to change the physical data schema to the green schema version. This is essentially done with the click of a button. On the database side, SIFODEM creates tables in the data schema according to the green schema version and populates them with data by simply reading the data in the green access schema. Afterwards, the data schema from the blue version as well as the auxiliary data schema can be cleared so that only the new green data schema remains. After running the physical migration, the final state 118 is entered and user devices use the new green version now—the data access schema is called GREEN_4 (migrated). At this state, the deployment cycle is finished and SIFODEM is ready to start the next evolution.

The migration phase 116 may cause limited availability of the application for a short period of time, since copying the data from the blue 100 to the green data schema locks the data tables. Hence, data cannot be written but can still be read during this time. To achieve zero-downtime migration, copy mechanisms may be deployed that migrate the data silently without blocking the operations and keeping the already migrated data in synchronization.

Developers interact with SIFODEM two times: once in the evolution phase 106 to create the new green schema version and once to trigger the migration phase 116. In the later phase data is copied from the blue data schema to the green data schema—this process is fully automated and does not require any further interaction of the developer. During the evolution phase, developers use the bidirectional SMO-based SIFODEM-DEL to describe the evolution of both the schema and the data from the old blue to the new green version as well as the propagation of write operations from the new green back to the old blue version.

Besides SIFODEM-DEL's relational completeness, this guarantees that both the blue and green schema version behave like regular single-schema databases.

There are SMOs to create, drop, and rename both tables and columns. Further, a table can be partitioned horizontally. The partition criteria may overlap and does not cover the whole relation. To ensure bidirectionality the inverse SMO for merging two tables horizontally also takes such partition criteria—this is performed to propagate new records in the green schema version back to the right partition in the blue one. Similarly, two more SMOs allow the system to decompose or join tables vertically. Either way, records from the decomposed side are joined according to the primary key, or a specified foreign key. The last SMO makes it possible to change the data type of a column.

The Add Column SMO adds a new column to the source view. It is a very common evolution operation. The output of this SMO is the evolved view with the new column. Since we are not modifying any artifacts (source table) in the Data Schema, we need an auxiliary table to store the new column value. The target view is a join of the source view and the auxiliary table. Consider an employee table in the data schema. On top of it is an employee view in the blue access schema. We consider this the initial state. The employees table and view have three columns ID, NAME, and AGE. We want to add Grade to the Employees View. The Initial State is what we have before we run the evolution. After we run the SMO, we get the new schema version which we name as Green Access Schema. The Employees View in the new schema has the new Grade column. The data for the Grade is stored separately in the Auxiliary Table. The new Employees View in the Green Access Schema, is a join between the Employees View in the Blue Access Schema and the Auxiliary Table in the Data Schema. The write operations on the new Employees View are handled by three "instead-of" triggers, i.e. Insert, Update and Delete. These triggers are based on the target view and propagate the write requests to the Source view and the Auxiliary Table.

The Drop Column SMO drops a column from the source view. The SMO takes the names of the view and the column we want to drop. The output of this operation is the target view without the dropped column in the new schema version. Consider the same initial scenario as in the previous paragraph. Here, we have an Employees View and we want to drop the Age column. The SMO takes the Employees View in the Blue Access Schema and the Age column as input and outputs the Employees View without the dropped Age column in the Green Access Schema. The Employees View in the Green Access Schema is based on the Employees View in the Blue Access Schema. Any write operation on the target view is propagated to the source view via the triggers. Three "instead-of" triggers are deployed which forward the requests to the source Employees View. The value of the dropped column which is dropped is set to NULL.

The Rename Column SMO renames a column. Sometimes developers need to change the names of columns. A general practice would be to rename the column in the physical table but in our methodology, we refrain from doing that. Instead we do this in the Access Schema. For that we can use the Rename column SMO. This SMO simply creates a new view based on the old view and uses a column alias name to portray the column with a different name in the new schema. Consider the same initial scenario as in the previous paragraph with an additional "Leaves" column. We want to rename the "Leaves" column to "Leave Days". When we run the SMO, it creates a new Employees View with the renamed column in the Green Access Schema. A create view statement would look like below. CREATE VIEW "Green". "Employees_View" AS SELECT ID, "Name", "Age", "Leaves" AS "Leave Days" FROM "Blue". "Employees_View"; There are three "instead-of" triggers to handle the write operations at the Green Access Schema. The trigger logic includes mapping the renamed column to the original column during the propagation.

The Horizontal Split SMO is an operation which a developer can use to horizontally partition a view into two views based on the conditions. The developer provides conditions for the split and the names for the two new view partitions. After the SMO is executed, we get two new views in the Green Access Schema with partitioned data based on the given condition. Consider the same initial scenario as in the "Add Column" paragraph with an additional "Grade" column. The goal is to split the employees table horizontally based on the value in the Grade column. For example, if the Grade is "A", two partitions are created, one with Grade equal to "A", and another with Grade not equal to "A". The SMO takes as input the condition and the employees view of the Blue Access Schema. This results in two views in the Green Access Schema partitioned based on the Grade value.

With the Horizontal Merge SMO the data of two views can be merged provided they have the same structure. One needs to provide the name of the two views. For each view, we mention a condition to indicate the propagation of write operation to one of the two views based on the matched condition. It is the opposite of the Horizontal Split operation. Consider the result of the horizontal split operation in the last paragraph, i.e. the Green Access Schema, and consider it to be the Blue Access Schema. The goal is to horizontally merge the two partitions into one. The SMO takes the two views in the Blue Access Schema, and the condition as input. After running this SMO, we get a merged view that is the union of the two views.

The Horizontal Merge SMO decomposes the source view into two views. The decomposition occurs on a Foreign Key column. To understand it better let us consider an example. In an Employees View we have a Column named Grade that we want to normalize to 3NF (Third normal form) and create a separate view for the Grade Column. This Grade View would have its unique values along with its own IDs. This SMO takes as input the name of the view and the foreign key column name. It then generates the two decomposed views, view 1 containing the foreign key, and view 2 containing the newly generated ID values for the decomposed column.

The Join on foreign key SMO can be used to join two views that have a foreign key relation between them. It is the reverse of the Decomposition on Foreign Key SMO. It takes the two views as input and returns the joined view as output in the new schema version. Consider Blue Access Schema with two views, Employees and Grade. The Employees view has a column Grade_ID, which acts as a foreign key to the Grade view. Once the SMO is run, in the Green Access Schema, there would be an Employees view, which is the result of the join between the Employees and Grade views of the Blue Access Schema.

The Decomposition on primary key SMO performs a decomposition on the primary key. The user provides the details like the name of the view and the columns they want in each of the decomposed views. The output of this SMO is two decomposed views, each having the common primary key column. Consider an example with an Employees view in the Blue Access Schema. The view contains four columns ID, Name, Age, and Grade. The goal is to decompose the view into two views, an Employees view, and a Grade view, based on the primary key "ID". The SMO execution will create an Employees view with the columns ID, Name, and Age, and a Grade view with columns ID, and Grade in the Green Access Schema.

The Join on primary key SMO joins two views using the primary key of both the views. The user gives the two views and their respective primary key as input and gets the full outer joined view in the new schema version as output. It is the opposite of Decomposition on Primary key operation. Consider two views Employees and Grades in the Blue Access Schema. The goal is to join the views based on the primary key value of both views. The SMO takes as input the two views along with the primary key column and results in a joined view in the Green Access Schema.

Figure 2:
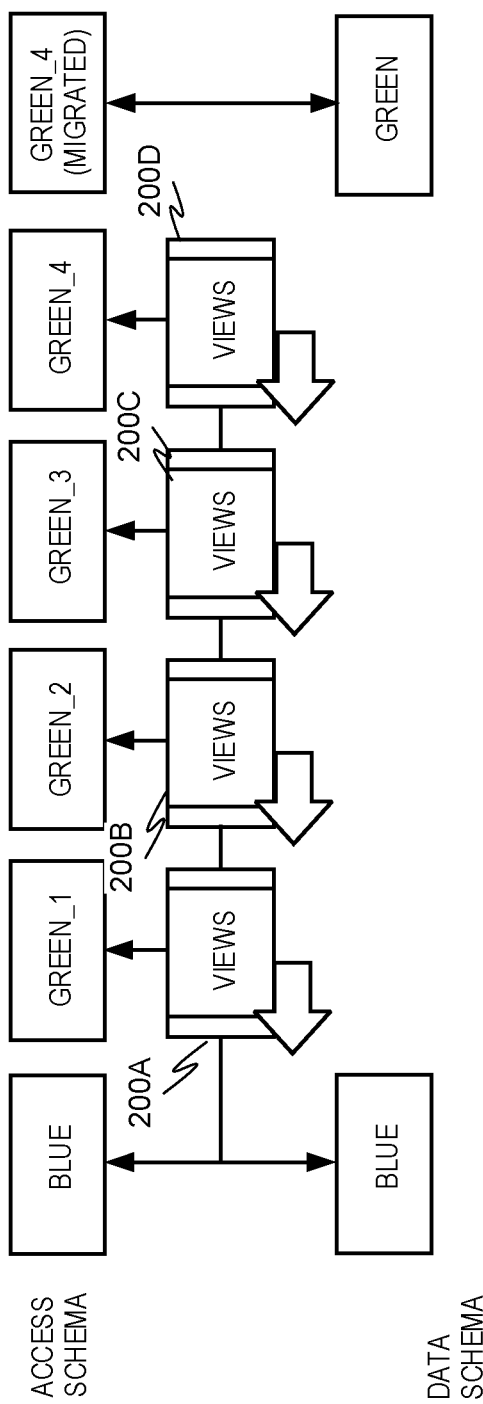
FIG. 2 is a diagram depicting the access schema and the data schema for the examples of FIG. 1 with the generated views and triggers, in accordance with an example embodiment.

The Change Column Type SMO changes the data type of a column. Sometimes a developer might want to change the data type due to change in functionality. To execute this operation, we need to provide source view name, the name of the Column whose type we want to change and the new data type for that column. The output would be the target view in the new schema version with changed type. Consider the initial scenario of the "Add column SMO" with an additional "Leaves" column. The goal is to change the data type of the "Leaves" column from Integer to Decimal. Execution of the SMO results in an Employees View in the Green Access Schema with the changed column type. In an example embodiment, SIFODEM is an independent component adjacent to a database management system (DBMS). It is not part of the DBMS but generates and deploys database artifacts that are then executed in the database, to evolve, test, and migrate it. As can be seen in FIG. 2, the database can be separated into an access schema layer and a data schema layer. The access schema layer comprises one or two schema versions that comprise views and triggers and the data schema layer comprises persistent data in the form of tables. The application interacts with the access schema instead of the data schema. This decoupling helps to avoid directly modifying the database schema and achieves concurrently active access schemas.

FIG. 2 is a diagram depicting the access schema and the data schema for the examples of FIG. 1 with the generated views and triggers, in accordance with an example embodiment. The green access schema version is implemented with a sequence of views 200A-200D starting at the blue data schema. The views are made updatable with instead-of triggers that propagate write operations also from the green to the blue schema version.

For each view 200A-200D, three instead-of triggers, such as inserts, updates, and deletes, may be defined. In most database systems, these triggers are row-wise triggers by default, i.e., they would execute one row at a time. This causes a significant propagation overhead when multiple records are updated at a time. Unfortunately, many DBMSes do not support statement-wise instead-of triggers. However, implementation of such statement-wise instead-of triggers can significantly speed up the propagation of write operations from the green access schema to the blue data schema. To explore the benefits, their behavior may be simulated via stored procedures that take the arguments of the write operations as parameters. In the example of FIG. 1, assume that it is desired to delete several employees because some departments of the company got sold or salaries are increased by 10%. Assume also that such write operations are executed on the green schema version before the migration. With row-wise triggers, this would cause one trigger call on each intermediate version for each single affected employee. A statement-wise instead-of trigger could instead fire one delete operation on the blue data schema as well as on each affected auxiliary table. Since all these executions are performed on a bulk of records at a time, it is very fast compared to row-wise execution.

SIFODEM realizes complex evolutions and migrations of a database in cloud applications. It significantly shortens the downtime and makes the migration process more predictable. A new green version co-exists with the old blue version to allow extensive testing—when the developers are sure that the new version works correctly SIFODEM is instructed to physically migrate the database with the click of a button. Developers specify the evolution as sequences of intuitive SMOs that all the generation of the co-existing green schema version without changing the data schema and without restricting the availability of the formed blue schema version. There is no hand-written data propagation between schema versions, hence a common source of failures is eliminated. Since the migration code is completely generated from the SMO-based evolution script, there is also no hand-written code involved that could fail or derail the migration.

Beyond this functional contribution, an extensive evaluation of SIFODEM with special focus on the impact of row/column stores and the use of row- or statement-wise triggers can be examined. In an example, an employee table was loaded with 150,000 sample records and both read and write operations on both the blue and green schema version as well on the intermediate schema versions as shown in FIG. 2 were evaluated to analyze the impact of the evolution length on the performance overhead. The general expectation is that the propagation overhead increases with a growing number of SMOs in the evolution. To quantify this overhead, the use of SIFODEM is compared to not using it. An evolution performed without SIFODEM requires manual implementation of evolution and migration programs (e.g., in SQL) that would ultimately result in GREEN_4 (migrated). Therefore, the readings on the migrated green schema version are considered as a baseline for measurements. All measurements are represented as a factor of its respective baseline. For instance in FIG. 3A it can be seen that a select with batch size 1000 on GREEN_2 in a row-store takes 2.25 the time of the baseline, which is a SELECT with batch size 1000 on GREEN_4 (migrated) in a row-store. The batch size is the number of rows selected, inserted, updated, or deleted by a single query.

FIG. 3A shows the propagation overhead for a read operation for both row- and column stores. The main observation is that the propagation overhead increases from BLUE to GREEN_4 for both batch sizes especially in row-stores—in column stores the effect is less dominant. As expected, the propagation time increases with each SMO in the evolution.

Further, the time taken by a SELECT operation in a column-store compared to row-stores is significantly smaller. This may be attributed to the fact that column stores use heavily read-optimized storage structures. For many SMOs, the propagation logic joins auxiliary tables with the data tables, which works perfectly with the query processing pattern of column-stores.

The same evaluation is performed for insert operations and presented in FIG. 3B. Again, the propagation overhead increases for both row- and column-stores when moving from BLUE schema to GREEN_4 schema. The complex decomposition with a foreign key between GREEN_2 and GREEN_3 requires the generation of new surrogate key values and causes a steep rise in the propagation overhead. Between GREEN_3 and GREEN_4 the rise is not that steep as a column is merely renamed. In GREEN_4 (migrated), the data schema matches the green access schema, hence the propagation is no longer required and the performance goes back to normal. Comparing row- and column-store, it can be seen that row-stores performed better for insert operations. In the worst-case scenario, the propagation overhead for inserts in a column-store is around factor 6.5 while it is only factor 4.5 for row stores.

FIGS. 3C and 3D show the propagation overhead for update and delete operations. Again, the propagation time increases with each SMO in the evolution and drops down again after the migration. In comparison to the GREEN_4 (migrated) schema version, the worst-case propagation overheads for both row- and column-stores are two orders of magnitude higher. Further, the worse case for an update operation in a column-store is roughly 2.3 times higher than in a row-store. Similarly, it is around 2 times higher for a delete operation.

Furthermore, the number of records also affects the propagation overhead. For an insert operation, the propagation overhead grows roughly the same for 100 and 1000 records, and it does not necessarily increase with an increasing batch size. On the other hand, a select operation generally causes a higher overhead with growing batch sizes. The update and delete operations show roughly similar overhead growths for the two batch sizes. There is significant increase between BLUE and GREEN_1. While the blue access schema allows deleting and updating the whole batch with one single statement, the row-wise triggers are fired for every affected record in the green schema versions.

As expected, the propagation overhead increases with the number of SMOs in the evolution. Further, column-stores facilitate significantly faster reading but row-stores allow faster writing. Hence, the common advantages and disadvantages of row- and column-stores also hold for the fixed data access patterns determined by the used SMOs.

The propagation of write operations through sequences of SMOs may be implemented with instead-of triggers. Statement-wise triggers are more feasible than common row-wise triggers, since they cause a significantly smaller propagation overhead. FIGS. 4A to 4C show the propagation overhead for insert, update, and delete operations, respectively. Again, GREEN 4 (migrated) is taken as the baseline. For instance, in FIG. 4A the duration of inserting 100 records at GREEN 3 with row-wise triggers is 3.73 times higher than at GREEN 4 (migrated).

FIG. 4A shows the performance comparison of row-wise vs. statement-wise triggers for insert operations. In both the cases, as the SMOs progress in the evolution, the propagation overhead increases. The worst-case propagation overhead for statement-wise trigger for batch size of 1000 is 1.23 times that of the baseline value. With row-wise trigger, the propagation overhead is 4.28 times, which is still around 3.6 times higher than that of statement-wise triggers. Hence, insert operations can greatly benefit from statement-wise instead-of triggers.

FIGS. 4B and 4C show the same measurements for update and delete operations. Similarly, the update and delete operations show an increasing propagation overhead when moving along the sequence of SMOs. The worst-case propagation overhead with row-wise triggers is two orders of magnitude more than the baseline value for both the update and the delete operation. The propagation overhead for updating the GREEN 4 schema version with batch size 1000 is 208 times the baseline values—doing the same with statement-wise triggers is only a factor of 2.9, which is roughly 69 times below row-wise triggers. Similar behavior can be seen for the delete operation as well.

The comparison between row-wise and statement-wise triggers shows that the later perform significantly better. Instead of propagating the write operation for every single affected record with row-wise triggers, different write statements may be propagated that can affect multiple records.

During the migration phase, there are many operations carried out apart from the data migration. In order to understand the actual impact of the database migration time, the insert statement may be isolated. The result may be compared to a simple table migration operation where the same amount of data is copied from one table to another table with the same schema. The migration may start for 150,000 records and then move to 1,000,000 then 5,000,000 and finally to 10,000,000 records. For each record set size, the migration is run five times, with the highest and the lowest migration times being excluded, and taking the average of the rest.

Figure 5:
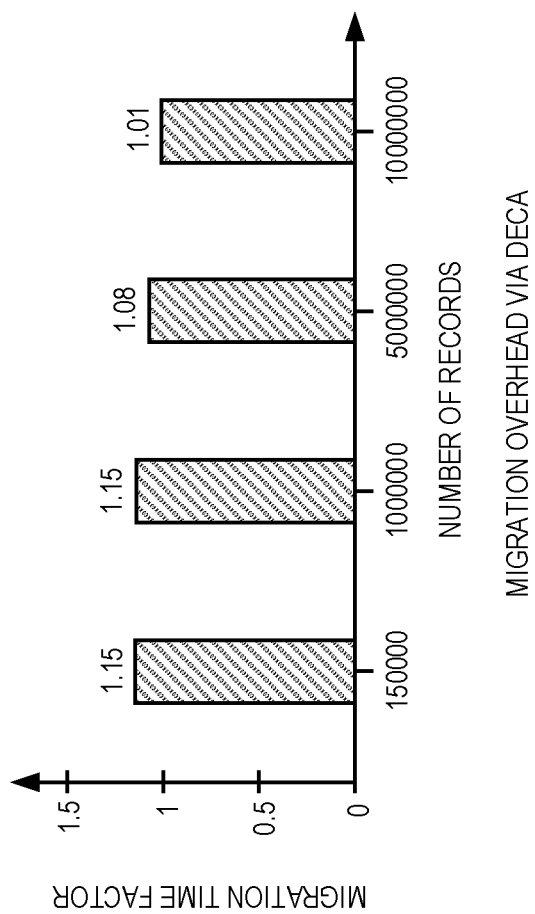
FIG. 5 shows example times taken for migration via SIFODEM as a factor of the simple migration, in accordance with an example embodiment.

FIG. 5 shows the times taken for the migration via SIFODEM as a factor of the simple migration. For SIFODEM, a slightly higher migration time is recorded because the read operation is expensive, as it needs to read the values via the sequence of SMOs. The migration time with SIFODEM is close to that of a naive migration and it scales nicely with the number of records. The more records the higher the cost for the actual data movement and the smaller the impact of the data access propagation for reading.

The migration time with SIFODEM is mainly determined by the actual transfer of the data—the overhead introduced by the migration through the sequence of SMOs is negligibly small.

The propagation overhead of single SMOs may then be examined in isolation.

Figure 6:
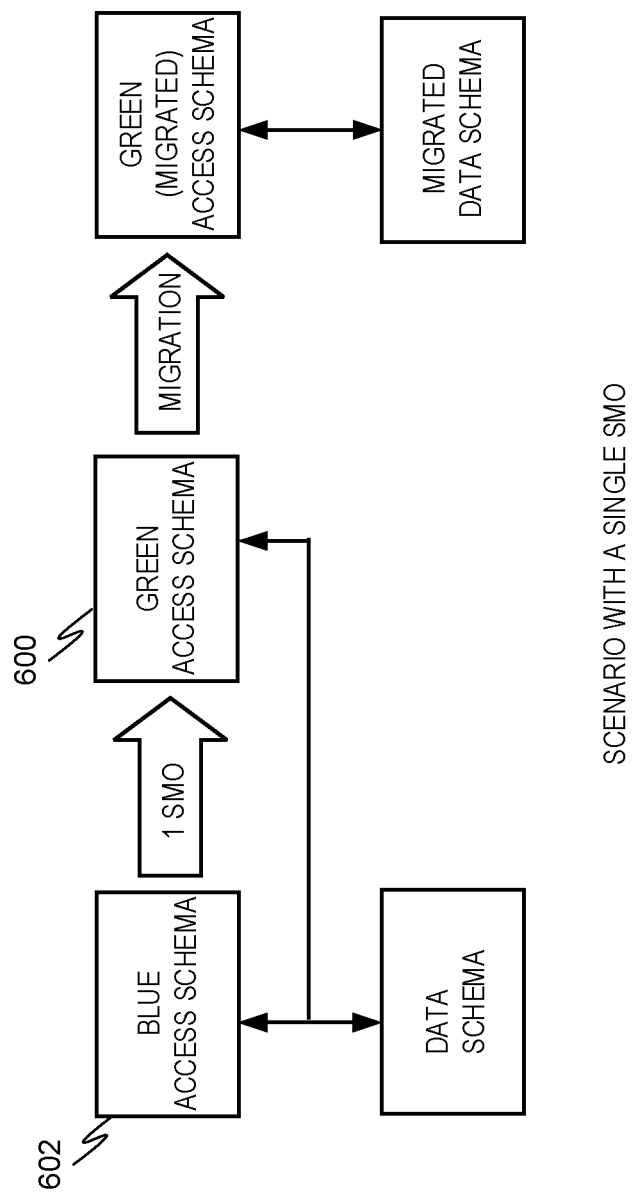
FIG. 6 is a diagram illustrating a general setup of a row-store with statement-wise triggers, in accordance with an example embodiment.

The knowledge about the different characteristics of the different SMOs helps developers to design and plan evolutions/migrations more profoundly. A row-store with statement-wise triggers may be used. The general setup is shown in FIG. 6. The green schema version 600 contains one or two simple tables that are loaded with 150,000 sample records. The green schema version 600 is obtained by applying exactly one SMO at a time. Again, read and write operations of 100 or 1000 records are executed on the green schema version 600. The baseline is the execution time with data being already migrated to the green data schema 600. Before the migration, the operations take more time on the green schema version 600, as they need to be propagated to the blue data schema 602 first. The factor of this measured time compared to the baseline is the overhead that is actually caused by the respective SMO. The overhead for read operations is in the range below milliseconds and thereby subject to measuring errors; hence, the write operations may be the focus here. For instance, in FIG. 7A, propagating an insert operation with one hundred records through the ADD COLUMN SMO from the green schema version 600 to the blue schema version 602 takes 1.1 times as long as executing it directly on the migrated green schema.

Figure 7A:
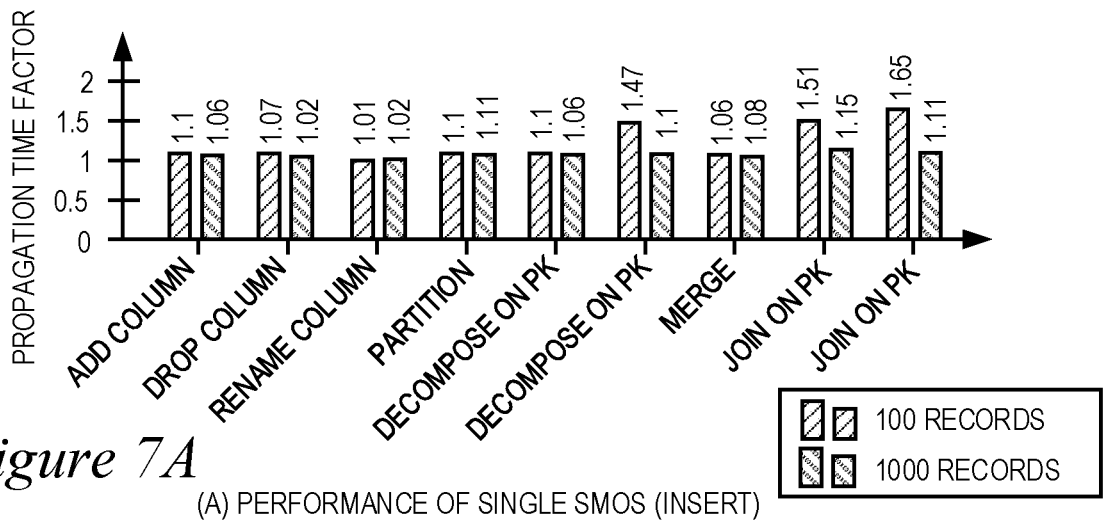
FIG. 7A shows the overhead of propagating an insert operation through different Schema Modification Operations (SMOs), in accordance with an example embodiment.

FIG. 7A shows the overhead of propagating an insert operation through the different SMOs. In general, the overhead caused by insert operations is very small-usually below 10%. Merely, the SMOs that involve writing to multiple tables show higher propagation overhead. For instance, joining two tables from the blue schema version 602 to one table in the green schema version 600 requires writing to the two data tables whenever data is inserted to the joint view in the green schema version 600.

Similarly, the partitioning and the decomposition on a foreign key involves auxiliary tables that cause a noticeable overhead. Another interesting observation is that the overhead decreases when more records are written. A statement-wise trigger is used: the time for transforming the statement from the green to the blue version are independent of the number of records. Hence this overhead is negligibly small compared to writing more and more records.

Figure 7B:
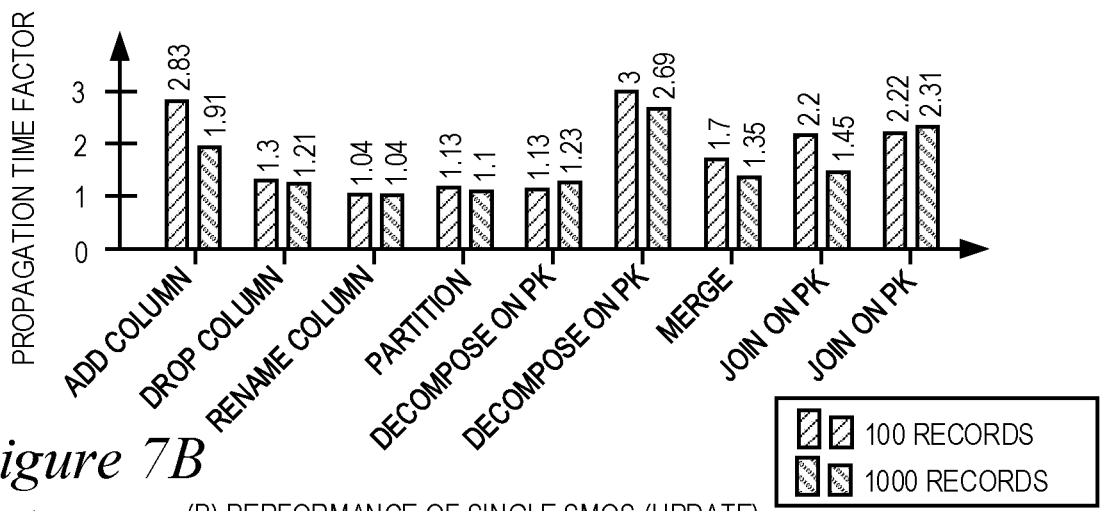
FIG. 7B shows the overhead of propagating an update operation through different SMOs, in accordance with an example embodiment.
Figure 7C:
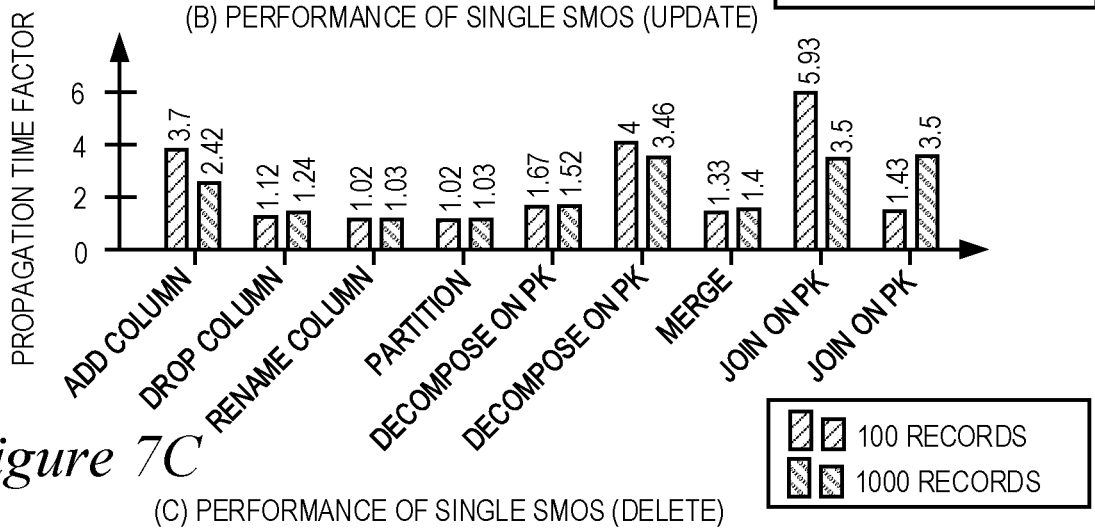
FIG. 7C shows the overhead of propagating an delete operation through different SMOs, in accordance with an example embodiment.

FIGS. 7B and 7C show the same evaluation for update and delete operations respectively. Again, SMOs that involve multiple joins or write operations on multiple tables have a higher propagation overhead. For instance, propagating an update through a DECOMPOSE ON FK SMO involves executing a join and updating both data tables and auxiliary tables. As a result, it is 3 times slower than the baseline for batches of 100 records. Further, for example, the propagation of a delete operation through a JOIN ON PK involves deleting records from both the tables in the blue data schema 602, which causes a 5.9 times higher execution time for 100 records.

Generally, the overhead for propagating write operations through single SMO is very small. Merely SMOs that involve multiple joins or writing to multiple tables can cause higher overheads. Developers that are aware of these characteristics can better plan resources for development, testing, and migrations.

Figure 8:
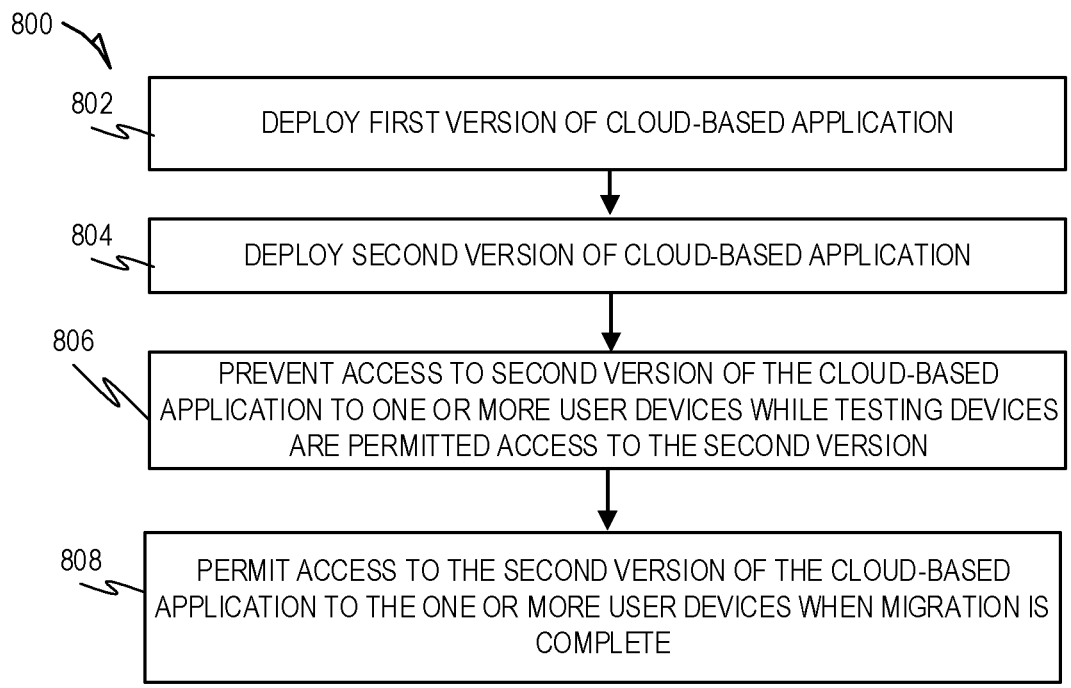
FIG. 8 is a flow diagram illustrating a method, in accordance with an example embodiment, for deploying a cloud-based application.

FIG. 8 is a flow diagram illustrating a method 800, in accordance with an example embodiment, for deploying a cloud-based application. At operation 802, a first version of a cloud-based application is deployed. The first version of the cloud-based application contains references, based on a first schema, to a first database. At operation 804, a second version of the cloud-based application different than the first version is deployed. The second version of the cloud-based application contains references, based on a second schema, to the first database. At operation 806, access to the second version of the cloud-based application to one or more user devices is prevented while permitting testing devices to have access to the second version of the cloud-based application, while migrating data from the first schema of the first database to the second schema of the first database. At operation 808, access to the second version of the cloud-based application to the one or more user devices is permitted once the migrating of the data is complete.

EXAMPLES

Example 1

A system comprising:
at least one hardware processor; and
a computer-readable medium storing instructions that, when executed by the at least one hardware processor, cause the at least one hardware processor to perform operations comprising:
deploying a first version of a cloud-based application, the first version of the cloud-based application containing references, based on a first schema, to a first database;
deploying a second version of the cloud-based application different than the first version, the second version of the cloud-based application containing references, based on a second schema, to the first database;
preventing access to the second version of the cloud-based application to one or more user devices while permitting testing devices to have access to the second version of the cloud-based application, while migrating data from the first schema of the first database to the second schema of the first database; and
permitting access to the second version of the cloud-based application to the one or more user devices once the migrating of the data is complete.

Example 2

The system of Example 1, wherein the operations further comprise:
storing first data added to the first database in the second schema in one or more auxiliary tables when it is determined that the first data is not compatible with the first schema, wherein the first data is not compatible with the first schema when it cannot be stored in the first database using the first schema.

Example 3

The system of Example 2, wherein the first data is a new column not present in the first schema.

Example 4

The system of Example 2, wherein the storing is performed by executing one or more schema modification operations (SMOs).

Example 5

The system of Example 4, wherein the SMOs correspond to an add column command.

Example 6

The system of Example 5, wherein each type of command that modifies a schema corresponds to a different set of one or more SMOs.

Example 7

The system of any of Examples 1-6, wherein the first database is managed by a multi-schema-version database management system.

Example 8

A method comprising:
deploying a first version of a cloud-based application, the first version of the cloud-based application containing references, based on a first schema, to a first database;
deploying a second version of the cloud-based application different than the first version, the second version of the cloud-based application containing references, based on a second schema, to the first database;
preventing access to the second version of the cloud-based application to one or more user devices while permitting testing devices to have access to the second version of the cloud-based application, while migrating data from the first schema of the first database to the second schema of the first database; and
permitting access to the second version of the cloud-based application to the one or more user devices once the migrating of the data is complete.

Example 9

The method of Example 8, further comprising:
storing first data added to the first database in the second schema in one or more auxiliary tables when it is determined that the first data is not compatible with the first schema, wherein the first data is not compatible with the first schema when it cannot be stored in the first database using the first schema.

Example 10

The method of Example 9, wherein the first data is a new column not present in the first schema.

Example 11

The method of Example 9, wherein the storing is performed by executing one or more schema modification operations (SMOs).

Example 12

The method of Example 11, wherein the SMOs correspond to an add column command.

Example 13

The method of Example 12, wherein each type of command that modifies a schema corresponds to a different set of one or more SMOs.

Example 14

The method of any of Examples 8-13, wherein the first database is managed by a multi-schema-version database management system.

Example 15

A non-transitory machine-readable medium storing instructions which, when executed by one or more processors, cause the one or more processors to perform operations comprising:
  deploying a first version of a cloud-based application, the first version of the cloud-based application containing references, based on a first schema, to a first database;
  deploying a second version of the cloud-based application different than the first version, the second version of the cloud-based application containing references, based on a second schema, to the first database;
  preventing access to the second version of the cloud-based application to one or more user devices while permitting testing devices to have access to the second version of the cloud-based application, while migrating data from the first schema of the first database to the second schema of the first database; and
  permitting access to the second version of the cloud-based application to the one or more user devices once the migrating of the data is complete.

Example 16

The non-transitory machine-readable medium of claim 15, wherein the operations further comprise:
  storing first data added to the first database in the second schema in one or more auxiliary tables when it is determined that the first data is not compatible with the first schema, wherein the first data is not compatible with the first schema when it cannot be stored in the first database using the first schema.

Example 17

The non-transitory machine-readable medium of claim 9, wherein the first data is a new column not present in the first schema.

Example 18

The non-transitory machine-readable medium of Example 9, wherein the storing is performed by executing one or more schema modification operations (SMOs).

Example 19

The non-transitory machine-readable medium of Example 11, wherein the SMOs correspond to an add column command.

Example 20

The non-transitory machine-readable medium of Example 19, wherein each type of command that modifies a schema corresponds to a different set of one or more SMOs.

Figure 9:
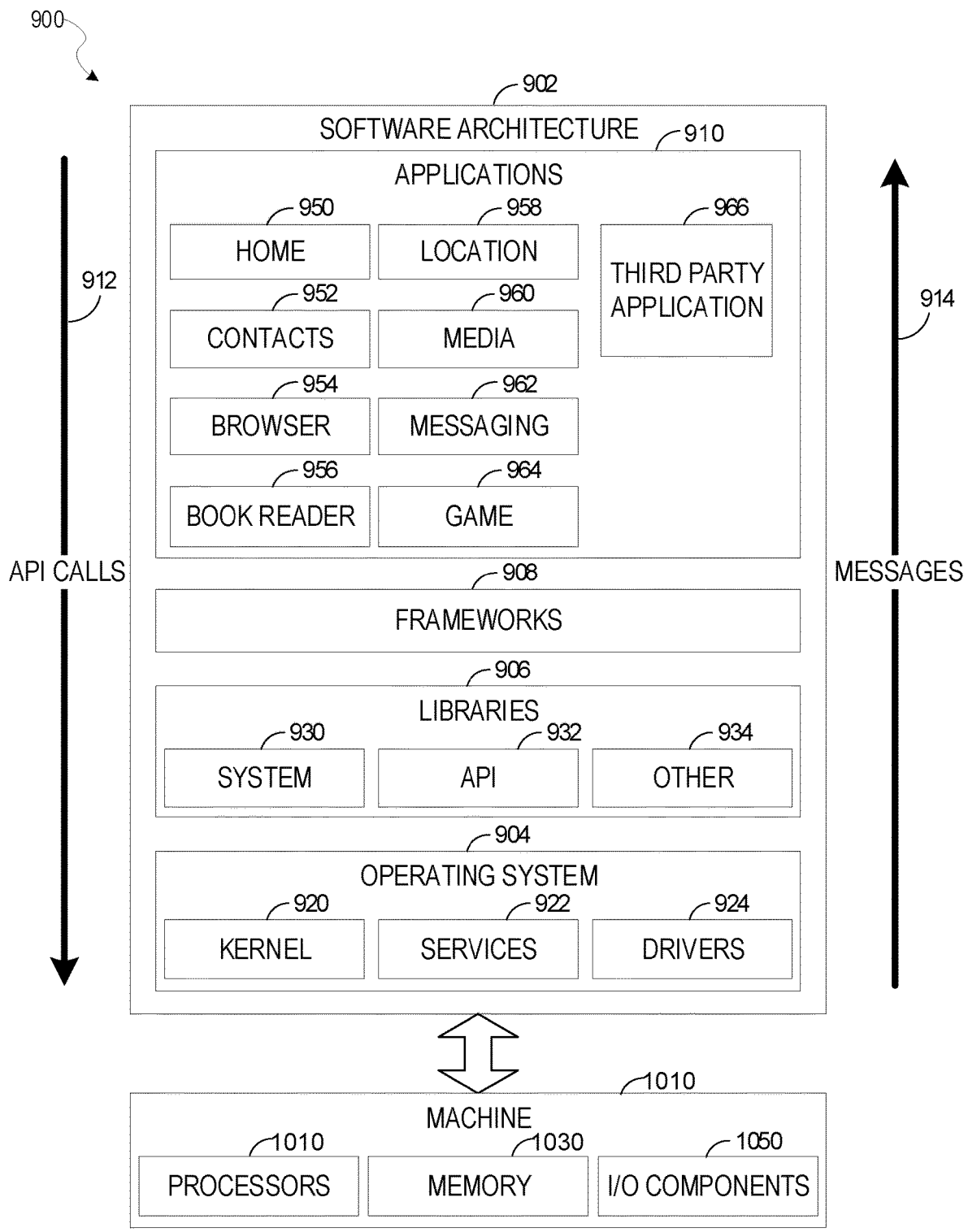
FIG. 9 is a block diagram illustrating an architecture of software, which can be installed on any one or more of the devices described above.

FIG. 9 is a block diagram 900 illustrating an architecture of software 902, which can be installed on any one or more of the devices described above. FIG. 9 is merely a non-limiting example of a software architecture, and it will be appreciated that many other architectures can be implemented to facilitate the functionality described herein. In various embodiments, the software 902 is implemented by hardware such as a machine 1200 of FIG. 12 that includes processors 1210, memory 1230, and input/output (I/O) components 1250. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
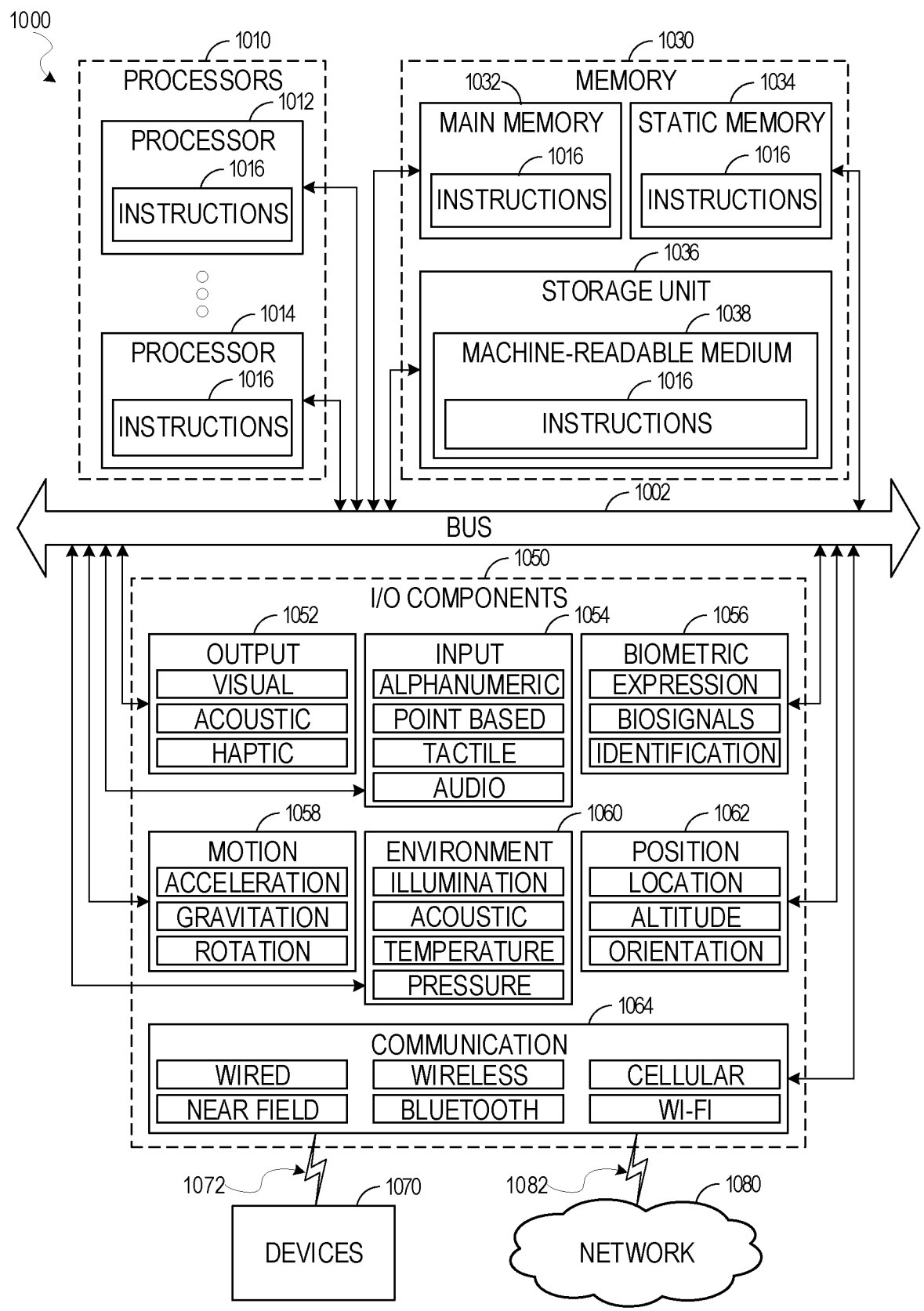
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the method 800 of FIG. 8. Additionally, or alternatively, the instructions 1016 may implement FIGS. 1-15, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiples cores, or any combination thereof.

The memory 1030 may include a main memory 1032, a static memory 1034, and a storage unit 1036, both accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include RFID tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   deploying a first version of a cloud-based application, the first version of the cloud-based application containing references, based on a first schema, to a first database;
   deploying a second version of the cloud-based application different than the first version, the second version of the cloud-based application containing references, based on a second schema, to the first database, the first schema and the second schema co-existing in the same instance of the first database and also sharing data in the database, such that write operations performed to add data to the first database using the first schema are reflected in the second schema so that the added data is available to be read using the second schema while data is available to read using the first schema, and such that write operations performed to add additional data to the first database using the second schema are reflected in the first schema so that the added additional data is available to be read using the first schema;
   preventing access to the second version of the cloud-based application to one or more user devices while permitting testing devices to have access to the second version of the cloud-based application, while migrating data from the first schema of the first database to the second schema of the first database; and
   permitting access to the second version of the cloud-based application to the one or more user devices once the migrating of the data is complete.

2. The system of claim 1, wherein the operations further comprise:
   storing first data added to the first database in the second schema in one or more auxiliary tables when it is determined that the first data is not compatible with the first schema, wherein the first data is not compatible with the first schema when it cannot be stored in the first database using the first schema.

3. The system of claim 2, wherein the first data is a new column not present in the first schema.

4. The system of claim 2, wherein the storing is performed by executing one or more schema modification operations (SMOs).

5. The system of claim 4, wherein the SMOs correspond to an add column command.

6. The system of claim 5, wherein each type of command that modifies a schema corresponds to a different set of one or more SMOs.

7. The system of claim 1, wherein the first database is managed by a multi-schema-version database management system.

8. A method comprising:
   deploying a first version of a cloud-based application, the first version of the cloud-based application containing references, based on a first schema, to a first database;
   deploying a second version of the cloud-based application different than the first version, the second version of the cloud-based application containing references, based on a second schema, to the first database, the first schema and the second schema co-existing in the same instance of the first database and also sharing data in the database, such that write operations performed to add data to the first database using the first schema are reflected in the second schema so that the added data is available to be read using the second schema while data is available to read using the first schema, and such that write operations performed to add additional data to the first database using the second schema are reflected in the first schema so that the added additional data is available to be read using the first schema;
   preventing access to the second version of the cloud-based application to one or more user devices while permitting testing devices to have access to the second version of the cloud-based application, while migrating data from the first schema of the first database to the second schema of the first database; and
   permitting access to the second version of the cloud-based application to the one or more user devices once the migrating of the data is complete.

9. The method of claim 8, further comprising:
   storing first data added to the first database in the second schema in one or more auxiliary tables when it is determined that the first data is not compatible with the first schema, wherein the first data is not compatible with the first schema when it cannot be stored in the first database using the first schema.

10. The method of claim 9, wherein the first data is a new column not present in the first schema.

11. The method of claim 9, wherein the storing is performed by executing one or more schema modification operations (SMOs).

12. The method of claim 11, wherein the SMOs correspond to an add column command.

13. The method of claim 12, wherein each type of command that modifies a schema corresponds to a different set of one or more SMOs.

14. The method of claim 8, wherein the first database is managed by a multi-schema-version database management system.

15. A non-transitory machine-readable medium storing instructions which, when executed by one or more processors, cause the one or more processors to perform operations comprising:

deploying a first version of a cloud-based application, the first version of the cloud-based application containing references, based on a first schema, to a first database;

deploying a second version of the cloud-based application different than the first version, the second version of the cloud-based application containing references, based on a second schema, to the first database, the first schema and the second schema co-existing in the same instance of the first database and also sharing data in the database, such that write operations performed to add data to the first database using the first schema are reflected in the second schema so that the added data is available to be read using the second schema while data is available to read using the first schema, and such that write operations performed to add additional data to the first database using the second schema are reflected in the first schema so that the added additional data is available to be read using the first schema;

preventing access to the second version of the cloud-based application to one or more user devices while permitting testing devices to have access to the second version of the cloud-based application, while migrating data from the first schema of the first database to the second schema of the first database; and permitting access to the second version of the cloud-based application to the one or more user devices once the migrating of the data is complete.

16. The non-transitory machine-readable medium of claim 15, wherein the operations further comprise:

storing first data added to the first database in the second schema in one or more auxiliary tables when it is determined that the first data is not compatible with the first schema, wherein the first data is not compatible with the first schema when it cannot be stored in the first database using the first schema.

17. The non-transitory machine-readable medium of claim 16, wherein the first data is a new column not present in the first schema.

18. The non-transitory machine-readable medium of claim 16, wherein the storing is performed by executing one or more schema modification operations (SMOs).

19. The non-transitory machine-readable medium of claim 18, wherein the SMOs correspond to an add column command.

20. The non-transitory machine-readable medium of claim 19, wherein each type of command that modifies a schema corresponds to a different set of one or more SMOs.

* * * * *